Jan. 17, 1950     E. P. WHITLOW     2,494,977
REFRIGERATION
Filed April 4, 1947
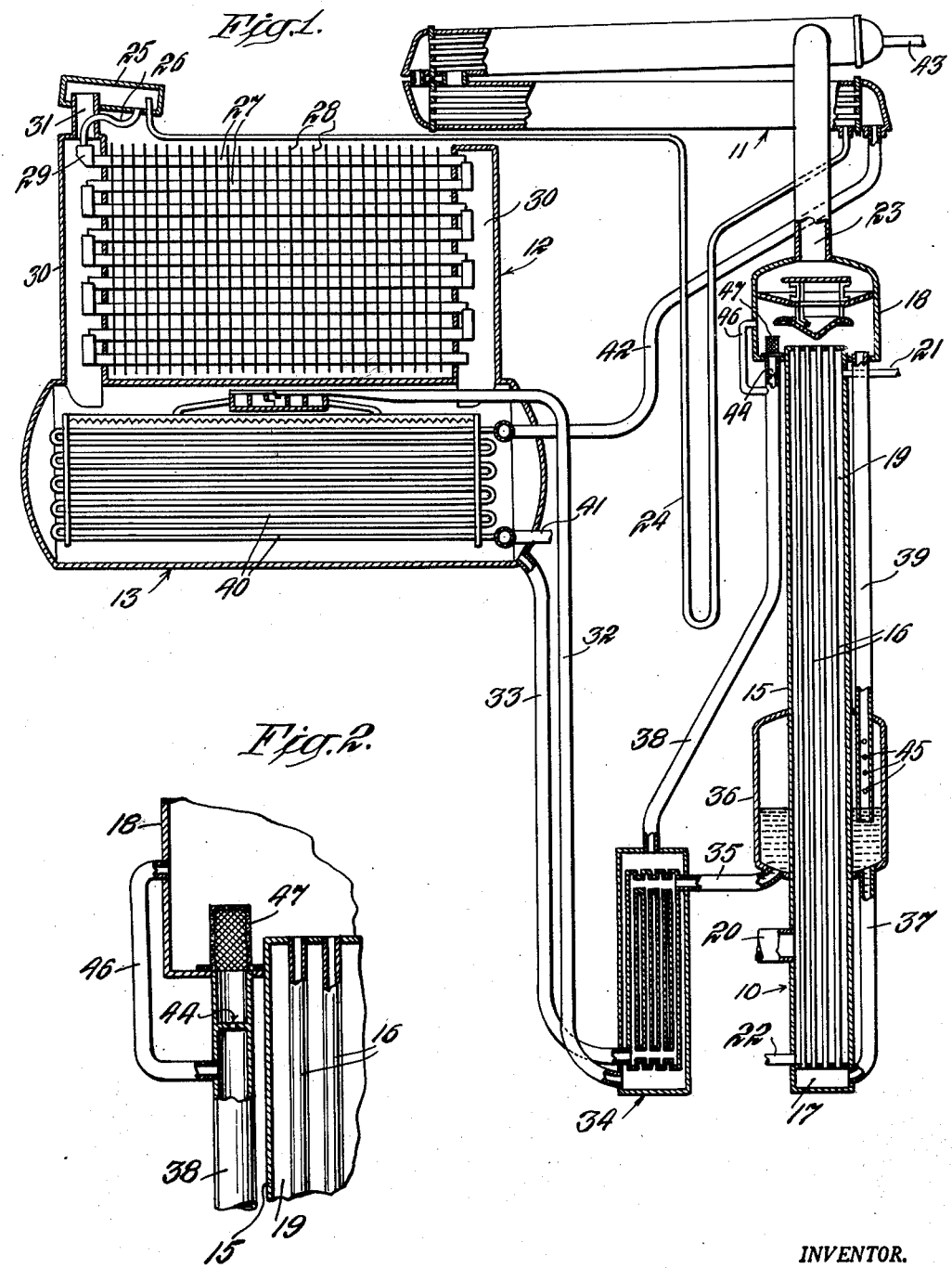
INVENTOR.
BY Eugene P. Whitlow
J. L. Kelly
ATTORNEY Patented Jan. 17, 1950

2,494,977

UNITED STATES PATENT OFFICE 2,494,977

REFRIGERATION

Eugene P. Whitlow, Evansville, Ind., assignor to Servel, Inc., New York, N. Y., a corporation of Delaware Application April 4, 1947, Serial No. 739,278

6 Claims. (Cl. 62—119)

This invention relates to refrigeration and particularly to absorption refrigerating systems.

In absorption refrigerating systems of the gravity type, that is, systems wherein refrigerant vapor expelled from a refrigerant-absorbent solution in the generator is utilized to pump or lift absorption solution to an elevation from whence such solution may flow to the absorber and return from the latter to the generator by force of gravity, it is often desirable that the generator be operated in a manner that the vapor-lift pump lifts absorption solution at a rate which is in excess to that required for optimum operation of other parts of the system. Such operation causes the generator to operate more steadily. However, some disposition must be made of the excess solution.

For instance, in two-pressure absorption refrigerating systems, particularly the vacuum or low-pressure type, it has been found that the refrigerant-absorbent solution in the generator or vapor expeller may be heated beyond its boiling point without its boiling. This superheating of the solution often results in irregular boiling which gives rise to undesirable noises. While studying this problem of superheat, it has been found that several factors which reduce superheating may increase the circulation or pumping rate of solution between the generator and absorber, in which case more than the optimum amount of solution may be sent to the absorber, with the result that the liquid heat exchanger between the generator and absorber may be overloaded and the absorber may be flooded with hot absorption solution.

It is, therefore, an object of this invention to provide an improvement in absorption refrigerating systems of the gravity type whereby the generator or vapor expeller operates at the optimum pumping rate for the generator without overloading the heat exchanger or flooding the absorber.

This object may be accomplished by allowing the generator to pump as much solution as may be desirable for optimum operation of the generator and then limiting the amount of solution delivered to the absorber. One specific manner of accomplishing this object is by providing a flow control in the form of an orifice, or the like, in the line which delivers absorption solution from the generator to the absorber, and of returning to the generator by way of a by-pass, or the like, any absorption solution pumped in excess of that required for optimum operation of the absorber.

The invention, together with the above and other objects and advantages, is set forth in more technical detail in the following description and accompanying drawing, wherein:

Fig. 1 is a view diagrammatically illustrating an absorption refrigerating system embodying the invention; and Fig. 2 is an enlarged detail view, partly in vertical section, of an upper part of the generator shown in Fig. 1.

For purposes of illustration, I have incorporated my invention in a two-pressure absorption refrigerating system like that described in U. S. Patent to A. R. Thomas and P. P. Anderson, Jr., No. 2,282,503 granted May 12, 1942. A system of this type operates at low pressures and includes a generator or vapor expeller 10, a condenser 11, an evaporator 12, and an absorber 13 which are interconnected in such a manner that flow of fluids between the high and low pressure sides of the system is maintained by liquid columns. The disclosure in the aforementioned Thomas and Anderson patent may be considered as being incorporated in this application, and, if desired, reference may be had thereto for a detailed description of the refrigeration system.

The generator 10 includes an outer shell 15 within which are disposed a plurality of vertical riser tubes 16 having the lower ends thereof communicating with an inlet chamber 17 and the upper ends thereof extending into and above the bottom of a separating vessel 18. A space 19 within shell 15 forms a steam chamber about the tubes 16 to which steam is supplied from a suitable source through a conduit 20. The space 19 provides for full-length heating of tubes 16, a vent 21 being provided at the upper end of shell 15. A conduit 22 is connected to the lower part of shell 15 for draining condensate from space 19.

The system operates at a partial vacuum and contains a refrigerant-absorbent solution, in which, for example, water is the refrigerant, and a water solution of lithium chloride, lithium bromide or a mixture of the two is the absorbent. With steam being supplied through conduit 20 to space 19 at atmospheric pressure, heat is applied to tubes 16 whereby water vapor is expelled from solution. The residue absorption liquid is raised by gas or vapor-lift action with the expelled water vapor forming a central core within an upwardly rising annulus of the liquid. The expelled water vapor rises more rapidly than the liquid with the liquid following along the inside walls of tubes 16.

The water vapor flows upwardly through the tubes or risers 16 into vessel 18 which serves as a vapor separator. Due to baffling in vessel 18, water vapor is separated from the raised absorption solution and flows through conduit 23 into condenser 11 wherein the vapor is condensed. The liquid refrigerant formed in condenser 11 flows therefrom through a U-tube 24 into a flash chamber 25, and from the latter the liquid refrigerant flows through a conduit 26 into evaporator 12.

The evaporator 12 includes a plurality of horizontal banks of tubes 27 disposed one above the other and to which are secured heat transfer fins 28. The liquid refrigerant flowing to the evaporator is divided in any suitable manner for flow through the uppermost banks of tubes 27. The dividing of liquid refrigerant may be effected by providing a liquid distributing trough 29 into which the liquid flows from conduit 26. The liquid refrigerant passes through successively lower banks of tubes through suitable end connections which are open to permit escape of vapor from the tubes, and any excess liquid is discharged from the lowermost bank of tubes 27.

The liquid refrigerant supplied to tubes 27 evaporates therein to produce a refrigerating or cooling effect with consequent absorption of heat from the surroundings, as from a stream of air flowing over the exterior surfaces of the tubes 27 and fins 28. The vapor formed in tubes 27 passes out into end headers 30 which are connected at their lower ends to absorber 13. Flash chamber 25 is provided to take care of any vapor flashing of liquid being fed to the evaporator through U-tube 24. The flashed vapor formed in the initial cooling of the liquid flowing from condenser 11 passes from the flash chamber through a conduit 31 into one of the headers 30 and mixes with vapor formed in the evaporator, so that disturbances in the evaporator due to vapor flashing are avoided.

In the absorber refrigerant vapor is absorbed into concentrated absorption liquid which enters through a conduit 32. The diluted absorption liquid flows from the absorber through a conduit 33, a first passage in a liquid heat exchanger 34, a conduit 35, a stabilizing vessel 36 and a conduit 37 into the inlet chamber 17 of the generator. Water vapor is expelled out of solution in the generator by heating, and the residue absorption liquid is pumped by gas or vapor-lift action in riser tubes 16 into vessel 18, as explained above.

The absorption liquid in vessel 18 is concentrated since water vapor has been expelled therefrom in generator 10. This concentrated absorption liquid flows through a conduit 38, to be referred to in more detail hereinafter, a second passage in liquid heat exchanger 34, and conduit 32 into the upper part of absorber 13. This circulation of absorption liquid results from the raising of liquid by vapor-lift action in vertical riser tubes 16, whereby the liquid can flow to the absorber and return from the latter to the generator by force of gravity. The upper part of stabilizing vessel 36 is connected by a conduit 39 to separating vessel 18, so that the pressure in vessel 36 is equalized with the pressure in the upper part of generator 10 and condenser 11.

The heat liberated with absorption of refrigerant vapor in absorber 13 is transferred to a cooling medium, such as water, for example, which flows upward through a bank of vertically disposed pipe coils 40. The cooling medium enters the lower ends of the pipe coils through a conduit 41 and leaves the upper ends thereof through a conduit 42. Conduit 42 is connected to condenser 11, whereby the same cooling medium is utilized to cool both the condenser and the absorber, and from condenser 11 the cooling medium flows through a conduit 43 to waste.

In accordance with this invention, the flow of concentrated absorption solution from the generator to the absorber is controlled and any excess of such solution that is pumped through the riser tubes 16 into separating vessel 18 is returned to the generator. In the specific embodiment of my invention illustrated in the drawing, conduit 38 is provided with a metering orifice 44 in the upper portion thereof, which orifice controls the flow of concentrated absorption solution from vessel 18, through conduit 38, heat exchanger 34, and conduit 32 into the absorber. Should absorption solution be pumped into vessel 18 faster than such solution can pass through orifice 44, the excess solution accumulates in vessel 18 and overflows therefrom through vent conduit 39 into stabilizing vessel 36. As shown in Fig. 1, the lower end of vent conduit 39 extends below the level of liquid in the stabilizing vessel and this conduit is provided with vent openings 45 above this liquid level. A second vent or pressure equalizing conduit, 46, is connected between separating vessel 18 and conduit 38 immediately below the orifice 44. In order to protect the orifice 44, a screen 47 is provided at the inlet end of conduit 38. By varying the size and location of orifice 44, any desired quantity of absorption solution may be sent to the absorber, and any excess solution pumped into vessel 18 beyond this desired quantity will be returned to the generator via vent conduit 39, stabilizing vessel 36 and conduit 37.

Having thus described my invention, I wish it understood that I do not desire to be limited to the specific details of construction illustrated and described, for obvious modifications will occur to a person skilled in the art.

What is claimed is:

1. An absorption refrigerating system including a generator, a vapor separator, a condenser, an evaporator, an absorber, means for maintaining a constant reaction head on the generator and conduits interconnecting said elements for flow of a refrigerating medium and an absorption solution, said generator including means for lifting absorption solution into the vapor separator for flow therefrom through one of the above connecting conduits into the absorber, an orifice in said last-named conduit for metering the flow of absorption solution delivered to the absorber, and a by-pass connection between said vapor separator and said generator for returning to the generator any excess of absorption solution lifted into the vapor separator beyond that delivered to the absorber.

2. An absorption refrigerating system as set forth in claim 1 wherein the means for maintaining the constant reaction head on the generator includes a stabilizing vessel located between the absorber and the generator for receiving absorption solution from the absorber and delivering such solution to the generator.

3. An absorption refrigerating system as set forth in claim 1 wherein the orifice is located in said last-named conduit immediately below the separating vessel and a vent conduit is connected at one end to said last-named conduit immediately below the orifice and at its opposite end to the separating vessel.

4. An absorption refrigerating system as set forth in claim 1 wherein means are provided for maintaining a constant head of liquid above said orifice.

5. An absorption refrigerating system as set forth in claim 1 wherein a stabilizing vessel is located between the absorber and the generator and wherein the by-pass connection opens into the stabilizing vessel for flow of excess absorption solution from the separating vessel to the stabilizing vessel.

6. In the art of refrigeration through the agency of an absorption refrigerating system including a generator, a vapor separator, a condenser, an evaporator and an absorber, that improvement which comprises maintaining a constant pumping head on the generator, pumping absorption solution from the generator into the vapor separator by vapor-lift action at a rate that is optimum for operation of the generator but which rate is excessive for optimum operation of the absorber, maintaining a constant surface level of absorption solution in the vapor separator flowing absorption solution from the vapor separator to the absorber at an optimum constant rate of flow, and simultaneously returning to the generator any excess of the pumped solution beyond that delivered to the absorber.

EUGENE P. WHITLOW.

REFERENCES CITED

The following references are of record in the file of this patent:

UNITED STATES PATENTS

| Number | Name | Date |
|---|---|---|
| 1,798,946 | Maiuri et al. | Mar. 31, 1931 |
| 1,938,166 | Altenkirch | Dec. 5, 1933 |